(12) United States Patent
James et al.

(10) Patent No.: US 10,963,874 B2
(45) Date of Patent: Mar. 30, 2021

(54) E-COUPON SETTLEMENT AND CLEARING PROCESS

(71) Applicant: METAVANTE CORPORATION, Milwaukee, WI (US)

(72) Inventors: Vicki L. James, Schaumburg, IL (US); Jeffrey Jay Erdmann, Richfield, WI (US)

(73) Assignee: METAVANTE CORPORATION, Milwaukee, WI (US)

( * ) Notice: Subject to any disclaimer, the term of this patent is extended or adjusted under 35 U.S.C. 154(b) by 0 days.

(21) Appl. No.: 16/837,558

(22) Filed: Apr. 1, 2020

(65) Prior Publication Data
US 2020/0234298 A1 Jul. 23, 2020

Related U.S. Application Data

(63) Continuation of application No. 16/294,365, filed on Mar. 6, 2019, now Pat. No. 10,671,999, which is a (Continued)

(51) Int. Cl.
*G06Q 20/40* (2012.01)
*G06Q 20/10* (2012.01)
*G06Q 20/20* (2012.01)
*G06Q 30/02* (2012.01)
*G06Q 40/00* (2012.01)

(52) U.S. Cl.
CPC .............. *G06Q 20/40* (2013.01); *G06Q 20/10* (2013.01); *G06Q 20/20* (2013.01); *G06Q 20/204* (2013.01);
(Continued)

(58) Field of Classification Search
CPC ...... G06Q 20/40; G06Q 20/204; G06Q 20/20; G06Q 20/208; G06Q 20/10; G06Q 30/02; G06Q 40/12; G06Q 30/0225
See application file for complete search history.

(56) References Cited

U.S. PATENT DOCUMENTS

| 5,649,118 A | 7/1997 | Carlisle et al. |
| 6,047,267 A | 4/2000 | Owens et al. |

(Continued)

OTHER PUBLICATIONS

International Search Report, Form PCT/ISA/210, for International Application No. PCT/US05/42811 completed on Jan. 21, 2007 and dated Feb. 6, 2007 (3 pages).

*Primary Examiner* — Sonji N Johnson
(74) *Attorney, Agent, or Firm* — Finnegan, Henderson, Farabow, Garrett & Dunner, LLP

(57) ABSTRACT

A system that automates the clearing and settlement of electronic coupons (E-Coupons) by leveraging existing technologies and enabling E-Coupon redemption at any merchant having electronic funds transfer (EFT) capabilities, such as credit/debit card acceptance. The system reduces opportunities for fraud, reduces or eliminates the need for manual clearinghouse counting and sorting of coupons, and provides an electronic audit trail for coupon redemption, tying a specific purchase to a specific coupon. After registering and selecting coupons, consumers then use an E-Coupon card or account access device at a merchant's point-of-sale (POS) terminal. E-Coupon values are deducted from the consumer's final amount due. Both consumer package goods manufacturers (CPGs) and merchants may be charged a fee. Expired coupons are automatically removed from the account and their value refunded to the CPGs. Reports on redeemed coupons and consumer profiles can be generated and provided to CPGs or merchants.

20 Claims, 11 Drawing Sheets

Related U.S. Application Data continuation of application No. 12/344,954, filed on Dec. 29, 2008, now Pat. No. 10,248,951, which is a continuation-in-part of application No. 11/741,426, filed on Apr. 27, 2007, now abandoned, and a continuation-in-part of application No. 11/285,053, filed on Nov. 22, 2005, now Pat. No. 7,866,548.

(60) Provisional application No. 60/812,350, filed on Jun. 9, 2006, provisional application No. 60/632,332, filed on Dec. 1, 2004.

(52) U.S. Cl.
CPC ........... *G06Q 20/208* (2013.01); *G06Q 30/02* (2013.01); *G06Q 30/0225* (2013.01); *G06Q 40/12* (2013.12)

(56) References Cited

U.S. PATENT DOCUMENTS

| | | | |
|---|---|---|---|
| 6,694,300 B1* | 2/2004 | Walker | G06Q 30/02 705/14.25 |
| 7,213,750 B1 | 5/2007 | Barnes et al. | |
| 7,225,253 B2 | 5/2007 | Ofir et al. | |
| 7,566,000 B2 | 7/2009 | Agostino et al. | |
| 7,707,110 B2 | 4/2010 | Randall et al. | |
| 9,489,681 B2 | 11/2016 | Barous | |
| 2002/0046116 A1* | 4/2002 | Hohle | G06Q 20/10 705/14.27 |
| 2002/0087444 A1 | 7/2002 | DiPiero et al. | |
| 2002/0147617 A1 | 10/2002 | Schoenbaum et al. | |
| 2002/0147678 A1 | 10/2002 | Drunsic | |
| 2002/0198831 A1 | 12/2002 | Patricelli et al. | |
| 2003/0050831 A1 | 3/2003 | Klayh | |
| 2003/0061153 A1 | 3/2003 | Birdsona et al. | |
| 2003/0200118 A1 | 10/2003 | Lee et al. | |
| 2003/0229793 A1 | 12/2003 | McCall et al. | |
| 2004/0024638 A1 | 2/2004 | Restis | |
| 2004/0049427 A1 | 3/2004 | Tami et al. | |
| 2004/0073465 A1 | 4/2004 | Wilson | |
| 2004/0107135 A1* | 6/2004 | Deatherage | G06Q 30/0237 705/14.26 |
| 2004/0117250 A1 | 6/2004 | Lubow | |
| 2004/0210759 A1 | 10/2004 | Fitch et al. | |
| 2006/0190337 A1 | 8/2006 | Ayers et al. | |
| 2008/0052169 A1 | 2/2008 | O'Shea | |

* cited by examiner

E-COUPON SETTLEMENT AND CLEARING PROCESS

CROSS REFERENCE TO RELATED APPLICATIONS

This application is a Continuation of U.S. application Ser. No. 16/294,365 filed Mar. 6, 2019 (now allowed), which is a Continuation of U.S. application Ser. No. 12/344,954 filed Dec. 29, 2008, issued as U.S. Pat. No. 10,248,951, which is a continuation-in-part of and claims the benefit of priority from U.S. application Ser. No. 11/741,426, filed Apr. 27, 2007, which is incorporated herein by reference in its entirety and which claims the benefit of priority from U.S. Provisional Application No. 60/812,350, entitled "E-coupon System", filed Jun. 9, 2006, which is incorporated herein by reference in its entirety; and is a continuation-in-part of and claims the benefit of priority from U.S. application Ser. No. 11/285,053, filed Nov. 22, 2005, which is incorporated herein by reference in its entirety and which claims the benefit of priority from U.S. Provisional Application No. 60/632,332, filed Dec. 1, 2004, which is also incorporated herein by reference in its entirety.

BACKGROUND OF THE INVENTION

1. Field of the Invention

The present invention relates in general to the field of a discount processing system and method. More particularly, the present invention relates to an electronic discount processing system and method including electronic coupons.

2. Discussion of the Related Art

Discount coupons have changed very little since they were first introduced. The only significant enhancement to the couponing process occurred in 1985 with the introduction of unique product codes, which enabled coupons to be scanned, rather than manually keyed into the cash register.

One such unique product code is issued and managed by the Uniform Code Council (UCC). This unique product code system, or more specifically, a Universal Product Code (UPC), contains information identifying a manufacturer and an item in a numeric and graphical way. Because of numerous benefits, UPCs are now found on almost all items sold in retail outlets.

Despite the use of UPCs, the coupon clearing process is currently still inefficient, highly labor intensive, and vulnerable to fraudulent activity. Consumers clip coupons and redeem them at merchant locations for discounts off the purchase price of selected items. While the merchants provide an instant price adjustment on the products for which the coupons are submitted, these merchants must then wait one month or more for reimbursement by manufacturers (coupon sponsors).

While coupon redemption procedures vary by merchant, the typical process is diagrammed at FIG. 1. Once submitted by a consumer, the cashier scans a coupon at the merchant's point-of-sale (POS), for example, a cash register. The POS system matches the UPC of the coupon with the corresponding product from the purchaser's shopping basket. The POS system prints the coupon detail at the bottom of the purchaser's receipt and adjusts the total transaction amount accordingly. At the end of the shift (or day), the coupons collected at the POS are totaled as if they were cash. Then they are added to the cash sum of the POS to ensure that the overall total for the cash drawer is accurate.

For multiple store chains, the merchant sends all redeemed coupons to its corporate headquarters on a regular basis. In larger chains, the value of these coupons can easily total millions of dollars. Typically, the corporate headquarters boxes up all of the collected coupons and sends them to a third party clearinghouse. The clearinghouse then sorts through the millions of coupons, often by hand, separating them by coupon sponsor. The term "coupon sponsor," as used herein, is a product, goods or service provider, or manufacturer offering coupons. An invoice is then sent to each coupon sponsor for the total redeemed coupon values by merchant along with a processing charge (typically 8 cents per coupon) and the redeemed coupons. To detect fraudulent accounting, coupon sponsors often send these coupons to their own clearinghouse for validation. Therefore, it typically takes 4-6 weeks to reimburse the merchant and finally settle the accounts.

Electronic coupons and variations thereof have become more recently known in the art. For example, the below-referenced U.S. patents and published U.S. applications disclose embodiments that were at least, in part, satisfactory for the purposes for which they were intended. The disclosures of all the below-referenced prior United States patents and applications, in their entireties, are hereby expressly incorporated by reference into the present application for purposes including, but not limited to, indicating the background of the present invention and illustrating the state of the art.

U.S. Pat. Pub. No. 2004/0031856 and U.S. Pat. No. 6,607,136 each discloses a physical presence digital authentication system. U.S. Pat. No. 6,450,407 discloses a chip card rebate system. U.S. Pat. Pub. No. 2004/0056101 and U.S. Pat. No. 6,616,049 each discloses a retail sales customer marketing system with electronic coupon processing. U.S. Pat. Pub. Nos. 2002/0111864 and 2002/0077907 each discloses a system and method for managing a coupon. U.S. Pat. Pub. No. 2002/0194069 discloses business systems and methods for a consumer/vendor interface via the Internet to automatically provide discounts. U.S. Pat. Pub. No. 2003/0004831 discloses an interactive Internet shopping and data integration method and system. U.S. Pat. Pub. No. 2003/0130889 discloses a system and method for electronically generating, clipping and redeeming coupons. U.S. Pat. Pub. No. 2004/0054575 discloses a system, method and apparatus for distributing and redeeming customer-selected coupons. U.S. Pat. Pub. No. 2005/0109841 discloses a multi-interface compact personal token apparatus and methods of use. U.S. Pat. Pub. No. 2004/0249710 discloses methods and apparatus for implementing loyalty programs using portable electronic data storage devices.

However, for one reason or another, the above approaches do not solve the problem referred to herein. For example, some of the solutions in the above-cited art have the disadvantage of relatively high cost. Given that the financial and consumer products industries are competitive businesses, a preferred solution will be seen by the user as being cost effective and worthwhile. A solution is cost effective when it is seen by the user, e.g., a manufacturer, as compelling when compared with other potential uses that the user could make of its limited resources.

What is needed therefore is an electronic coupon "e-coupon" redemption, settlement, and clearing system that preferably: 1) allows for the automated validation of coupons with the purchase of qualifying products; 2) offers direct benefits including built-in anti-fraud components and coupon clearing cost efficiencies for consumer product manufacturers and service providers; 3) provides direct benefits to merchants that redeem coupons by expediting the coupon value reimbursement process; 4) increases stored-value systems revenue potential and production revenues; and 5) increases the potential effectiveness of consumer product manufacturer's coupon-related marketing efforts by making coupons more convenient and therefore potentially increasing consumer participation. The term "coupon," as used herein, may be represented in various forms such as a certain amount of dollars or cents off, a percentage off two-for-one offers, a bonus buy, a gift with purchase, a discount, and so on.

SUMMARY AND OBJECTS OF THE INVENTION

By way of summary, the present invention leverages a variety of technologies to preferably create an electronic coupon system that enables electronic coupon redemption at any merchant having electronic funds transfer (EFT) capabilities. Hence, this is considered an "open loop" system in that it can be used for multiple purposes at multiple locations.

This invention automates the coupon settlement and clearing process by utilizing a number of data communications technologies. Of course, this can be more easily accomplished if the coupon issuance and redemption process is also automated on the so-called front-end. This preferred front-end process is explained in co-pending U.S. patent application Ser. No. 11/741,426, filed Apr. 27, 2007 and entitled "E-Coupon System and Method."

The inventive settlement and clearing process, the so-called back end process, is primarily designed to stream-line the settlement of funds and reduce the opportunities for fraud. The inventive process also reduces the duration of the coupon clearing and settlement process in part by automating it. For example, in one preferred embodiment, coupons redeemed at point-of-sale (POS) are cleared in the same manner as stored-value cards. In this embodiment, as coupons are redeemed, they are matched against electronic coupon accounts pre-established by consumers/purchasers as described in the front-end "E-Coupon System and Method" redemption patent application. These electronic coupon accounts are linked to multiple stored-value reserve accounts pre-established by various coupon sponsors. The values of the coupons are automatically withdrawn from these accounts and electronically transmitted from the coupon sponsors' accounts to the redeeming merchant's account either in real-time or via a batch process.

Preferably, the inventive system processes coupons as a tender type (cash, credit, debit, etc.) rather than merely as an "electronic" coupon in which settlement processing and reimbursement take place several weeks later. By electronically capturing the coupon redemption at the POS and processing the reimbursement based on that POS electronic capture, the inventive system automates the redemption validation process. It also reduces the opportunities for human error and fraudulent behavior such as unauthorized re-use of coupons and/or erroneous aggregation of coupon values submitted to coupon sponsors. It ties a specific coupon to a specific purchase and also reduces or eliminates the need for manual clearinghouse counting and sorting and provides an electronic audit trail of coupon redemption.

In one embodiment, electronic coupon redemption occurs when the purchasing consumer uses his E-Coupon account access device, e.g., a plastic card having readable information, a cell phone, a device having a magnetic strip, a smart chip, a key fob, a wireless device such as that found in co-pending U.S. patent application Ser. No. 11/494,958 filed on Jul. 28, 2006 and entitled "Authorization System and Method", the contents of which are hereby incorporated by reference, or some other a portable electronic account information storage media, as a payment method at the POS or checkout counter. Utilizing the merchant's credit card or debit card rails, or other communication line, the transaction is authenticated by accessing the consumer's E-Coupon account on the E-Coupon program administrator's server. This server verifies coupon values and corresponding product UPCs.

Upon authentication or validation, a transaction processor then processes the aggregated amount preferably utilizing stored-value technology. A reconciliation of funds occurs real-time or at regularly scheduled intervals to extract redeemed coupon values from corresponding coupon sponsor settlement reserve accounts. After funds settlement with the coupon sponsor, the transaction processor utilizes automated clearing house (ACH) technology to transfer funds equivalent to the redeemed coupon values to the merchant that redeemed the coupons.

The transaction processing system in one embodiment includes: 1) a first data structure configured to contain eligible item identifiers representing available coupon sponsor coupons for items that are eligible for purchase by using a consumer using the at least one account; 2) a second data structure configured to contain product item identifiers for items that are presented for purchase by the consumer using the at least one account; 3) a third data structure configured to contain transaction data detail; and 4) a decision system using the eligible item identifiers representing available coupon sponsor coupons contained in the first data structure, the purchased item identifiers contained in the second data structure, and the transaction data detail contained in the third data structure to process transactions and provide transaction information to the point-of-sale system.

In one embodiment, the invention is a discount system that comprises a global communications network, at least one server operably connected to the network, an access portal on a server including purchaser or consumer instructions of use and information regarding discounts available from a multitude of coupon sponsors, an account access device for accessing purchaser account information from a database, and an apparatus at the POS which accepts at least one of product and service identification data. The purchasing consumer uses the account access device at a POS terminal to redeem coupons electronically. The POS is connected to a backend transaction processor through the global communications network or other communications means. Information is exchanged between the POS terminal and the transaction processor, including the consumer's account information and the UPCs from pending transactions.

As mentioned, the POS apparatus preferably reads product or service information or identification data, such as, a UPC or SKU from a bar code on the product presented for purchase. The SKU (Stock Keeping Unit) is a separate identification number used on consumer goods. The apparatus, e.g., a scanner or reader, preferably further reads purchaser account information from the account access device, e.g., a plastic card having readable information, a cell phone, a device having a magnetic strip, a smart chip, a key fob, a wireless device such as that found in co-pending U.S. patent application Ser. No. 11/494,958, or some other a portable electronic account information storage media. A processing system is provided to treat the discount as an electronic tender type at a point-of-sale (POS).

In one embodiment, the device used as a payment method at POS is also associated with the purchaser's E-Coupon account and the electronic coupon redemption and processing system is configured to determine that this payment device has been associated with an E-Coupon account. Consumers may modify the associated payment method by accessing their coupon accounts through the "front end" coupon account access system.

In one embodiment, the invention is an electronic coupon redemption and processing system in communication with a financial communications network. The system includes a network portal, and at least one server operable with the network portal. At least one server is operable with the financial communications network and is used to process financial transactions. A database of the system is connected to the network and contains consumer account information. A database also preferably contains consumer product selection information. A database preferably contains available coupon sponsor coupon information. Of course, one of ordinary skill in the art will realize that there could be multiple databases or just one database.

An E-Coupon processing business entity or program administrator preferably helps create a consumer account and houses selected coupon offers and consumer information. This business entity also preferably creates and sends an account access device, e.g., an account card, to the consumer. This business entity preferably further updates the consumer account as additional coupon offers are selected by the consumer from the website, with additional offers targeted at the consumer, as coupons are redeemed by the consumer, and/or as previously selected unredeemed coupon offers expire.

A method of an electronic redemption system in one embodiment preferably comprises the steps of: 1) setting up a coupon service for a participating coupon sponsor, 2) creating a coupon account for a consumer, 3) offering a variety of coupons to a consumer; 4) electronically adding selected coupons to the consumer's account; 5) presenting a product for purchase at a point-of-sale terminal at a merchant; 6) accessing the consumer's account from the point-of-sale terminal; 7) verifying the product presented at the point-of-sale by the consumer with the coupon in the consumer's account; 8) determining the value of the coupon to be subtracted from the total cost of the product presented; 9) deducting the coupon value from the total cost; 10) transmitting a revised total cost of the product back to the point-of-sale terminal 11) deleting the coupon from the consumer's coupon account; 12) creating a coupon redemption record for the merchant, i.e., retailer redeeming the coupon; 13) paying the merchant based on the coupon redemption record; 14) sending the redemption record to a coupon sponsor for the sponsor's coupon presented and approved at the point-of-sale terminal; and 15) deducting the coupon value from the coupon sponsor's reserve account. Additional steps may include: 16) creating a consumer profile report; 17) making the report available to at least one of the coupon sponsor and the merchant; 18) facilitating promotional communications between the coupon sponsor, merchant, and a targeted consumer; and 19) removing unredeemed coupons from the consumer's coupon account automatically upon coupon expiration and releasing any corresponding cash reserves back to the coupon sponsor. The system also preferably has open-loop access so that the card is redeemable at any merchant that currently accepts a multitude of coupon sponsors' coupons and has stored-value card acceptance capabilities at a point-of-sale.

In one embodiment, coupon detail reports are compiled and prepared, for example, for the merchant and the coupon sponsor on a regular basis, e.g., monthly. These "validation" reports are then sent to the interested party preferably electronically. They include, but are not limited to, a detailed accounting of coupon redemption activity for specified time periods, a summarization of active coupons/values/expiration dates, and a detailed accounting report of the movement of funds in and out of the coupon sponsor's reserve account.

In one embodiment, the program administrator may assess a coupon selection charge, a coupon redemption service charge, an account access device production charge, report generation charge, and/or a general participation service charge to combination of the merchant, consumer, and coupon sponsor.

In one embodiment, a print out or notification on an output screen at, for example, the point-of-sale is made available to the consumer to notify or remind said consumer of coupons added to the consumer's coupon account by either the consumer or a coupon sponsor. Preferably, the output screen can be configured to prompt for responses from the consumer or merchant.

In one embodiment, there is a predetermined maximum and minimum amount to the sponsor's reserve account. When sponsor's reserve account balance drops below minimum, more funds are added from the sponsor's cash reserves, up to the maximum amount.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
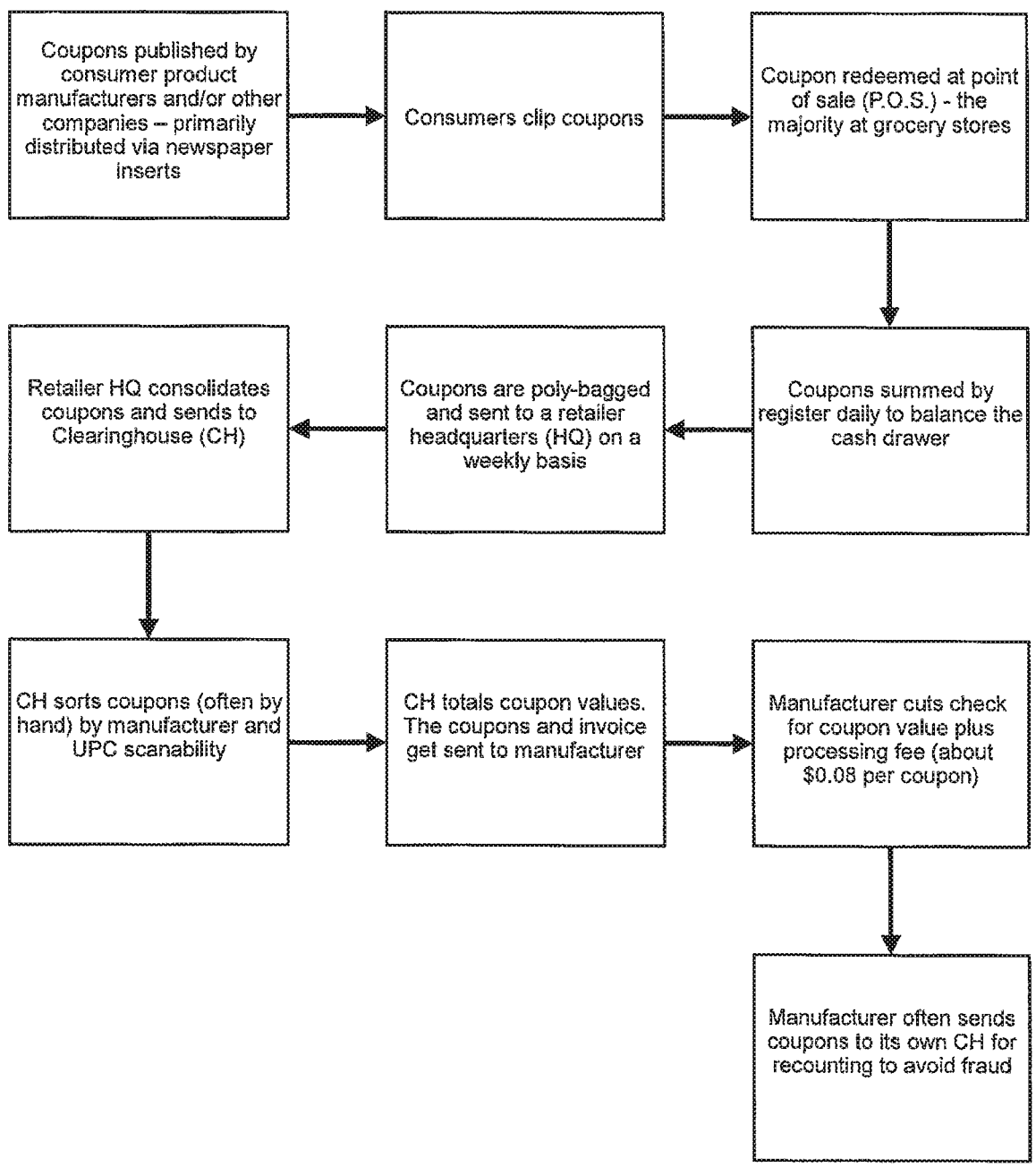
FIG. 1 illustrates a prior art flow chart diagram.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the words connected, connection, or terms similar thereto are often used. They are not limited to direct connection or attachment but include connection or attachment through other elements where such is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The invention is preferably a system that automates the clearing and settlement of E-Coupons. As mentioned earlier, such a system is called an "open-loop" system. An open-loop system having an access card is further described by the Assembly Committee on Banking and Finance in the following excerpt from an information hearing on "The Growing Use of Stored-Value Cards" dated Oct. 12, 2005. "With an open-loop system, the cardholder can use the card for multiple purposes and at many points of sale in order to purchase goods or services . . . " "Open-loop cards may be issued for use in one mall where the cardholder can use the card to make purchases at any store in the mall." "Other open-loop cards may be usable at any place a bank card is accepted, not just the stores in one mall."

In one embodiment, a coupon account would be created and "reloadable" with coupon values by the consumer, preferably via the Internet, and would replace the need for coupon clipping.

The system preferably comprises a mobile account presentation means, e.g., an access device for the consumer that has an account associated with it for coupon redemption at a Point-of-Sale (POS) terminal. The system also includes a program administrator for updating the account with selected product coupon values, product information, and expiration dates. Coupon sponsors, such as consumer product manufactures are asked, e.g., through cash reserves, to cover the value of each selected product coupon.

A mechanism allows registered consumers to check and print out their E-Coupon account contents, e.g., from a website if the access device is a card, or account contents may be directly viewed via the device if it is a cellular phone, PDA, or other wireless device. The mechanism also preferably allows consumers to update and reload their account with additional coupons at any time.

System requirements preferably are straight forward, as much of the technology required to support the E-Coupon card product offering currently exists. These requirements include a web portal for consumer access to coupons. The web portal could be developed and maintained internally by a program administrator, e.g., an E-Coupon processing company or by partnering with an existing on-line coupon website. One such existing website is www.smartsource.com, a News America Marketing company. This website features a vast array of coupons available for printing by consumers. It supplements the Smart Source Magazine, the nation's largest coupon freestanding insert (FSI), with distribution to 70 million households via 1,200 newspapers. Relationships with consumer package goods manufacturers (CPGs) are already in place at News America Marketing.

A second requirement is account set up ability, including preferably card order processing capability, which can be either outsourced or developed internally by the program administrator or E-Coupon processing business. Producing cards, programming cardholder identification information, and fulfilling card orders could also be outsourced or handled internally. Additional requirements, such as electronic funds transfer processing capabilities may be handled by electronic transaction payment processing companies. Finally, data management and report creation could be handled by the transaction processor, or a company providing strategic customer information services. Examples of reports include demographic and geographic profiles of E-Coupon account holders, by product and product category, and comparison of download and redemption trends against download and redemption trends of other manufacturers within the same product category. Another report may include consumer selected coupon statistics for a given geographical area, which a merchant in that same area may use for inventory control and in-store product placement. Additional system features will become apparent from the detailed description below.

2. Detailed Description of Preferred Embodiments

Definitions

Coupon Sponsor. Entity supplying or sponsoring coupon offer, typically a consumer product manufacturer, or so-called consumer package goods manufacturers (CPGs) such as Proctor & Gamble of Cincinnati, Ohio Consumer/Purchaser: Anyone who may use the E-Coupon system including retail shoppers, commercial/industrial buyers, and other purchasers or would be customers.

Transaction Processor: An entity to process the coupon redemption transactions. Preferably, the entity offers services that include electronic funds transfer (EFT) and other payment processing services including the compiling, analyzing, and reporting of the same. Such a preferred service provider may be Metavante Corp. of Milwaukee, Wis.

E-Coupon: An electronic representation of coupon or discount stored in a database and taking various forms such as a certain amount of dollars or cents off, a percentage off, two-for-one offers, a bonus buy, a gift with purchase, and so on.

Network: The coupon redemption transaction processing system, e.g., existing automated clearing house (ACH) systems which are tapped into existing financial transaction processing networks run, for example, by Visa® or MasterCard®.

Merchant: Location where Consumer redeemed coupon(s), usually a grocery store or a merchant such as Wal-Mart® or Walgreens®.

Program Administrator: An entity to manage the front-end or Consumer portion of the E-Coupon program and to work with the Coupon Sponsors to establish the manufacturer reserve accounts. Such a preferred service provider may be Metavante Corp. of Milwaukee, Wis.

FIG. 1 shows a prior art process of traditional coupon redemption and clearing. First, paper coupons are published by consumer product manufacturers and/or other companies. These paper coupons are primarily distributed through newspaper inserts or direct mailings. Consumers clip and save these coupons for use while shopping. Next, the paper coupon is redeemed at the point-of-sale terminal at a Merchant. Presently, the majority of coupons are redeemed at grocery stores. At the end of each business day, coupons are summed by register at the Merchant to balance cash drawers. Coupons are then typically bagged in clear plastic bags, e.g., polybags. In larger chains, polybags are regularly collected and sent to the merchant headquarters, e.g., on a weekly basis. The merchant headquarters (HQ) consolidates the coupons and sends them to a clearinghouse (CH). The clearinghouse sorts the coupons, often by hand, by manufacturer and UPC scanability. The clearinghouse totals the coupon values and sends the coupons and an invoice to the manufacturer. The manufacturer then issues a payment or check to the clearinghouse or directly back to the Merchant that originally redeemed the coupons. The invoice includes the coupon values plus a processing fee, which might be as much as eight cents per coupon. The manufacturer may then send the coupons to its own clearinghouse for recounting to detect fraud or inaccurate coupon counting.

Figure 2:
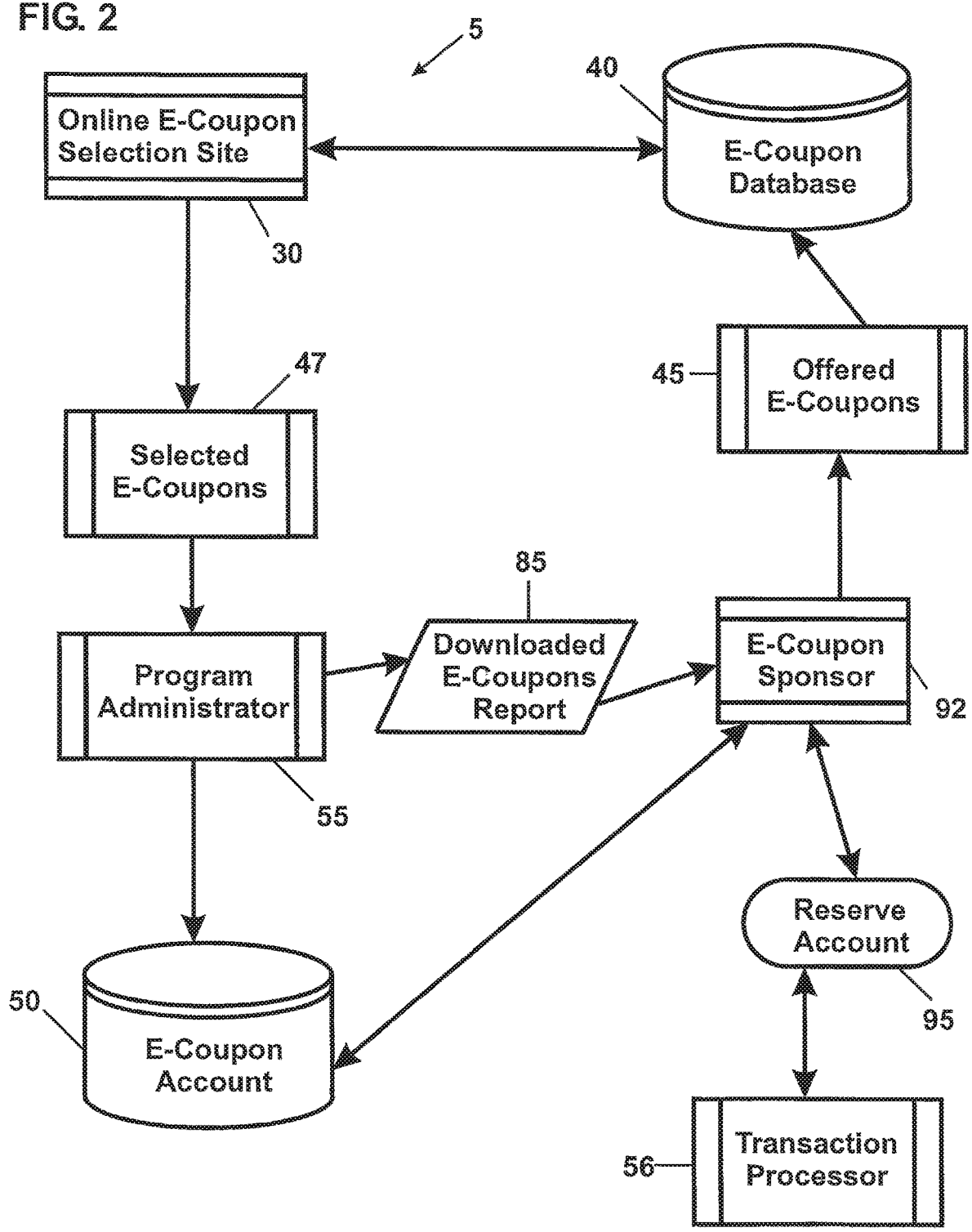
FIG. 2 illustrates a flow chart diagram according to one embodiment of the present invention.

Various preferred aspects of an E-Coupon system of the present invention are best illustrated in FIGS. 2-11. As shown in FIG. 2 and/or FIG. 4, the E-Coupon system 5 includes a Consumer 10 that accesses the E-Coupon system 5 through a global communication network 20, preferably the World Wide Web via the Internet.

Once access is gained to the system 5, the Consumer 10 is able to visit a coupon selection website 30. The coupon selection website 30 is connected to a coupon database 40 containing UPC and other information for goods and services for which E-Coupons are offered. The Consumer 10 is able to search, view and select coupon offerings, e.g., E-Coupons 45 of interest. Once the Consumer 10 has established an E-Coupon Account 50 through a registration process, e.g., FIG. 6, and a coupon selection is made (shown as block 47), preferably an E-Coupon value processing system, e.g. the Program Administrator 55, credits or "loads" the Consumer's E-Coupon Account 50 with detailed coupon information, such as UPC, amount, and expiration date, and stores this information in a database 60 associated with the Consumer's E-Coupon Account 50. The term "loads" as used in this application means the updating of the Consumer Account 50 with a coupon amount and/or other coupon/product information. The Coupon Sponsors 92 may also load a Consumer's E-Coupon Account 50 with E-Coupons 45. The Program Administrator 55 may also be responsible for providing a report 85 of selected E-Coupons 45 and their associated values to the Coupon Sponsors 92, such as a consumer-products manufacturer.

Once an E-Coupon 45 is selected, the Coupon Sponsor 92 preferably transfers funds to a cash reserve account 95 that may be accessed by the Transaction Processor 56 to reimburse Merchants, such as retailers, via electronic funds transfer ("EFT"), for the amount of the E-Coupon 45 upon redemption. Alternatively, there is a predetermined maximum and minimum amount for the sponsor's reserve account 95. When sponsor's reserve account balance drops below the minimum amount, the sponsor 92 transfers more funds to the cash reserve account 95, up to the maximum amount.

Figure 3:
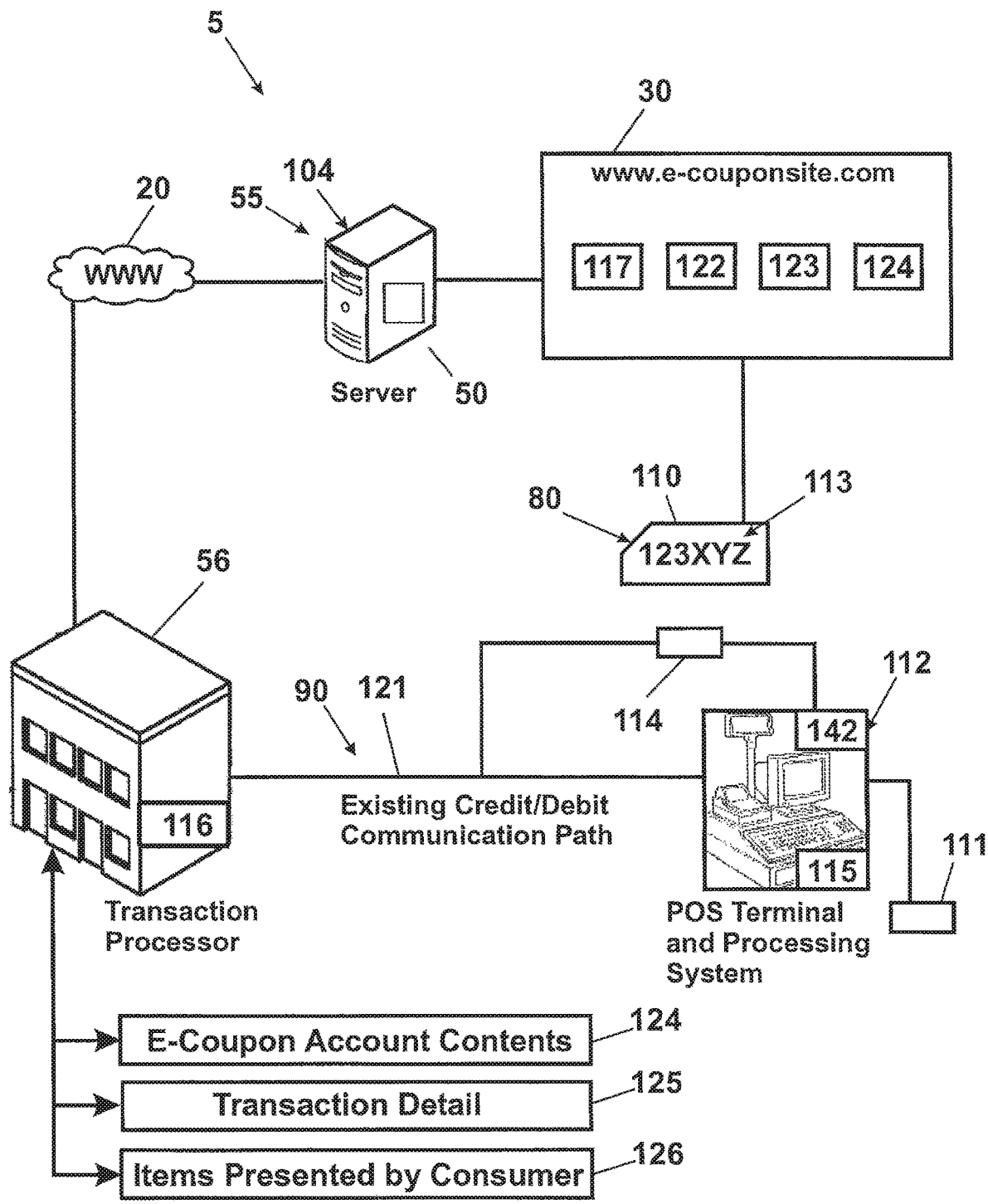
FIG. 3 illustrates a system diagram according to one aspect of the present invention.
Figure 4:
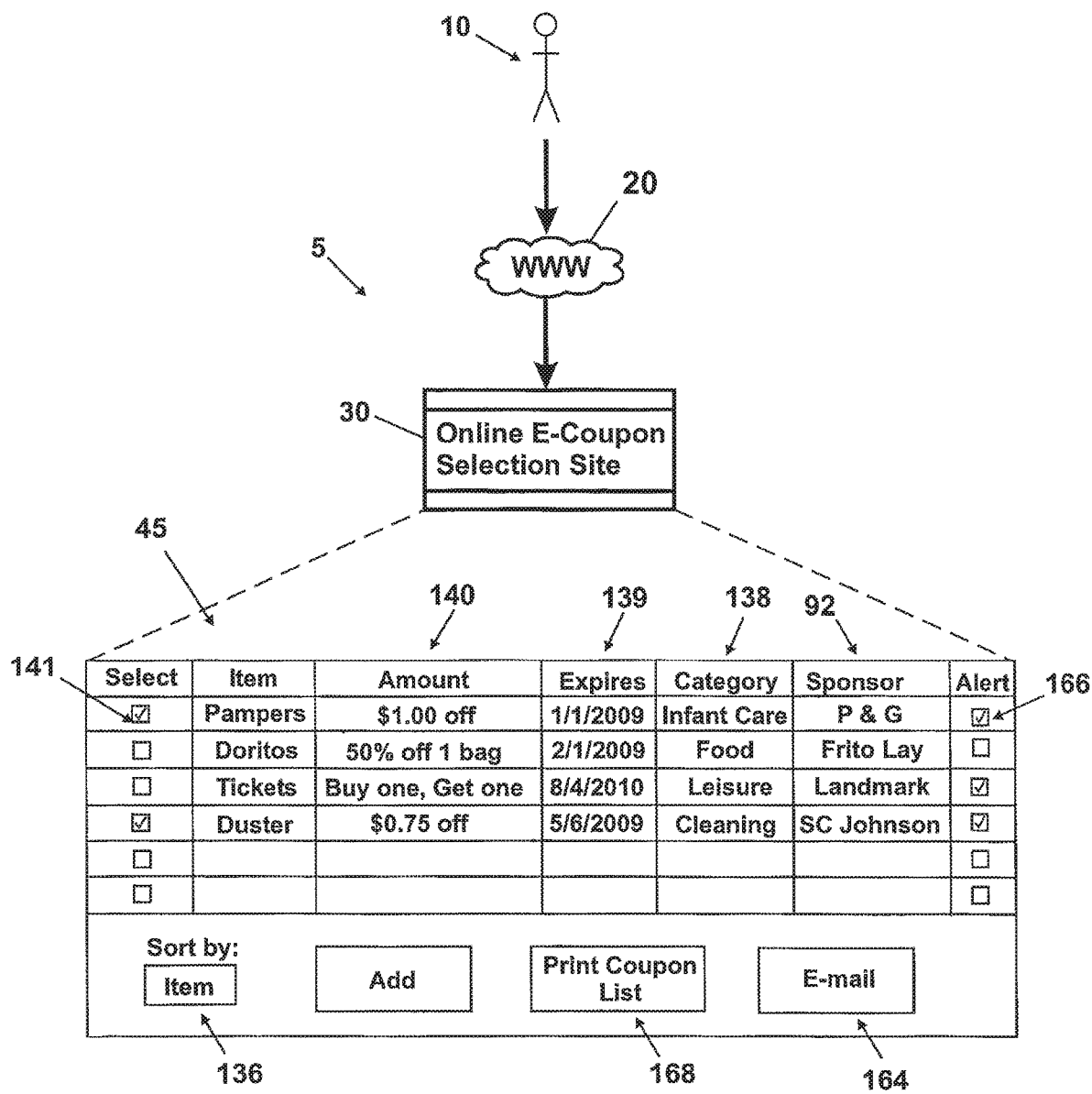
FIG. 4 illustrates an exemplary access portal according to one aspect of the present invention.

FIG. 3 shows another aspect of the invention, for example, a system 100 which includes the global communications network 20. Connected to the network 20 is preferably a server 104 operably connected to an access portal, e.g., E-Coupon website 30. At the access portal 30, Consumers, i.e., Purchasers, are provided with instructions 117 for account registration/setup and usage, as well as information 123 regarding available E-Coupons 45 from a multitude of Coupon Sponsors 92. After the initial registration process is complete, an E-Coupon Account 50 containing consumer information 109 is created and housed on the server 104. This information can be accessed through an account access device 80, (and 158 in FIG. 5) which may be a card, key fob, cell phone, personal digital assistant, personal computer, or similar device. Databases containing the consumer's account information 122, the coupons available from each Coupon Sponsor 92, which may include what brand, size, weight, discount, and etc. of each E-Coupon is available, 123 and the consumer's E-Coupon account contents 124, are connected to the network 20 via the server 104.

The global communications network 20 may be connected to a "back end" processor, e.g., Transaction Processor 56. Alternatively, the Transaction Processor 56 is preferably connected to an apparatus, e.g., POS terminal and processing system 112, in communication with a processor 115, through the existing electronic credit/debit processing connection 121 (e.g., so called "credit rails") or other communication connection. Such a system is described in U.S. application Ser. No. 11/285,053. Moreover, the connection 121 between the POS terminal 112 and the Transaction Processor 56 may be made directly through the Transaction Processor's EFT Network utilizing the ISO 8583 standard, through another financial institution's EFT Network, through a virtual private network (VPN) via the Internet, a direct line, or some other similar communication means. The information exchange between the terminal 112 and the Transaction Processor 56 includes the Consumer's E-Coupon Account information and the UPCs from items presented by the consumer 126 for the pending transaction. The exchange also includes an authorization amount response corresponding to the total coupon discount. The Transaction Processor 56 is in communication with a database, or data structure, 124 containing the consumer's E-Coupon account contents, a database, or data structure, 125 containing data on the transaction details, and a database, or data structure, 126 including items presented by the Consumer for purchase. The Transaction Processor 56 contains a decision system 116 that uses the eligible item identifiers representing the consumer's available Coupon Sponsor coupons contained in the first data structure 124, the transaction data detail contained in the second data structure 125, and the Consumer purchased item identifiers contained in the third data structure 126 to process transactions and provide transaction information to the POS system 112. Further, the POS system may contain a notification device 142, such as a display screen or print out, to alert the Consumer 10 as to which E-Coupons 45 have been added by the Consumer 10 or Coupon Sponsor 92 to the Consumer Account 50.

At the POS, or point of redemption, information, e.g., SKUs or UPCs, is read into the processing system 112 for each product to be purchased through a device, such as a UPC reader 111, connected to the system 112. Purchaser account identification information 113 stored on the E-Coupon Account card, i.e., access device 80, is also read into the system by an apparatus such as debit/credit card reader 114. This is done in conjunction with, or at the conclusion of; scanning the items the Consumer 10 is purchasing. In an alternative embodiment, the Consumer 10 could choose to associate the E-Coupon Account 50 with an existing payment device, for example a credit or debit card, in which case the access device 80 is the same as the same as the payment device, and would be recognized as such by the Transaction Processor 56.

Referring again to FIG. 4, a system for selecting E-Coupons 45 from an electronic coupon website 30 is shown. The Consumer 10, i.e., the Purchaser, accesses website 30 through a mechanism, e.g. the Internet 20, via computer, PDA, or other connectivity method. A listing of E-Coupons 45 is displayed on the screen in its entirety or limited by searching by Coupon Sponsors 92, by coupon category 138, or by other searchable fields. Such Coupon Sponsors 92 may be manufacturers or service providers such as Proctor & Gamble, General Cinema, and the like. The listing preferably has multiple sorting capabilities 136 that permit a Consumer 10 to sort by Coupon Sponsor 92, product or service type, product size, brand-name, particular store layouts, expiration dates 139, and so on. Description and value information 140 is also available for each E-Coupon 45 and underlying item product listed on the website 30. An example of available information for an E-Coupon 45 may include, Pledge® Dusters, $1.00 off any size, expires Dec. 31, 2010, General Cinema Movie Admission, $0.75 off, Applebee's® buy one dinner get one free, and so on. An interface 141 e.g., a clickable icon or selectable check box, allows Consumers 10 to select E-Coupons 45 of interest. A tool, e.g., a mouse, may be used to make such a selection. A link or portal, e.g. an icon leading to an online registration form, may also be present to allow a first-time user to enter required information, set up an account 50 to select E-Coupons 45, and make future selections using the website 30. Such a link may also allow users to update their account information, e.g., address and married name. Once the E-Coupons 45 have been selected, a coupon list may be printed via a mechanism, e.g. button 168. Other information about the product or the E-Coupon 45 may also be printed in this manner.

In addition, the Consumer 10 may select an e-mail button 164 on the website 30 to get further information about the products and E-Coupons 45 such as alerts prior to coupon expiration dates. In one embodiment, a check box 166 may be checked to receive product or coupon alerts for selected products when they become available.

In a separate embodiment, the E-Coupon Account 50 may only accept E-Coupons 45 from a particular Coupon Sponsor 92. Referring again to FIG. 2, a Coupon Sponsor 92 updates the E-Coupon Account 50 electronically with the E-Coupons 45 that have been selected by the Consumer 10. The E-Coupon Account 50 may also be updated as subsequent coupon offers are selected from the website 30 or as previously selected but unredeemed E-Coupons 45 expire.

Figure 5:
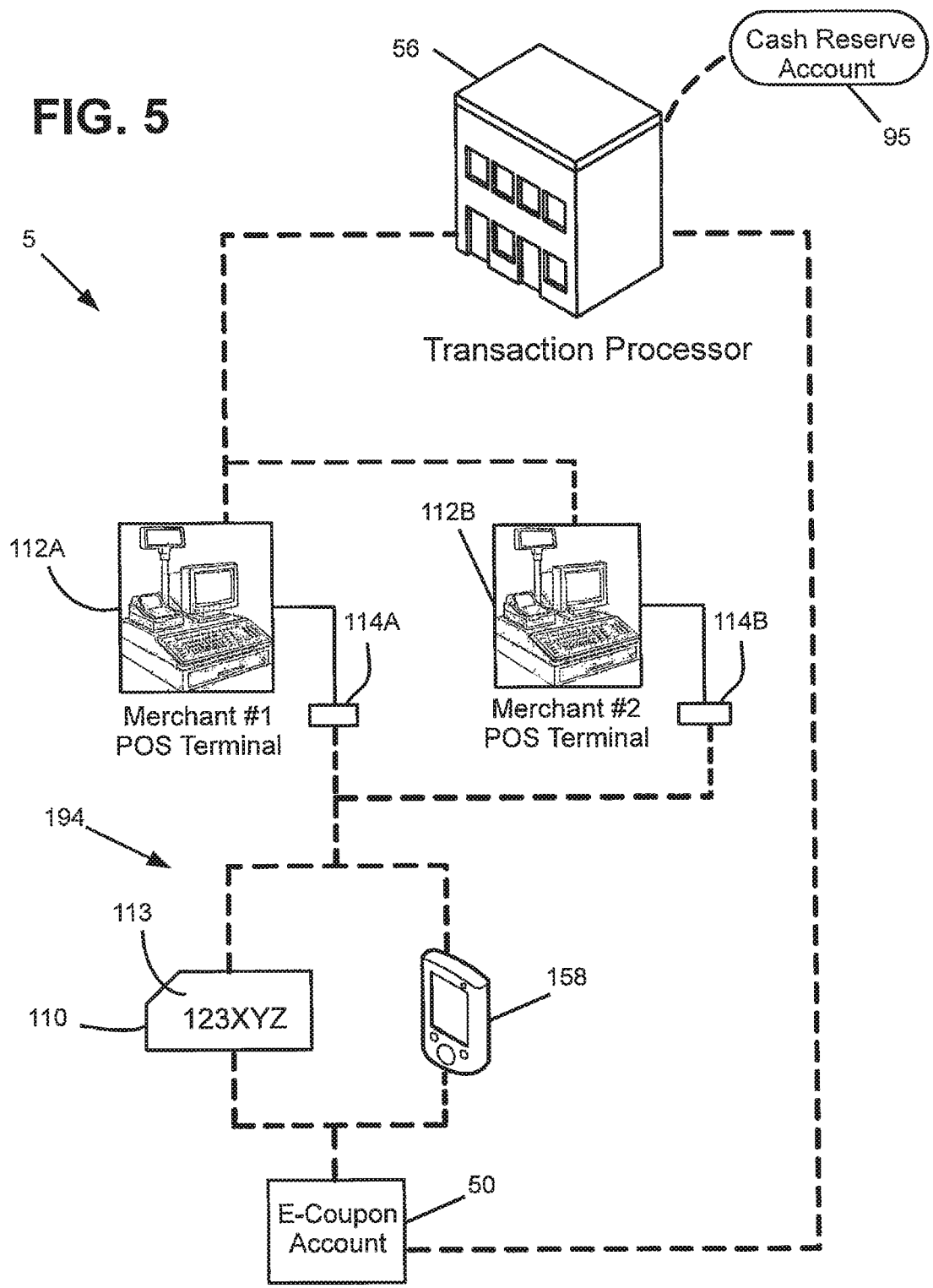
FIG. 5 illustrates a system diagram according to a further aspect of the present invention.

FIG. 5 illustrates another aspect of the electronic coupon system 5. Here the system 5 is shown with the Transaction Processor 56 connected to a plurality of Merchant POS systems or terminals 112. The Transaction Processor 56 processes the E-Coupons 45 but also accesses cash reserve accounts 95 from various Coupon Sponsors 92 that may be used to cover the value of E-Coupons 45 redeemed by the Consumers 10 at the terminals 112. One mobile account access device 158, shown in this aspect as a cell phone, which via a mechanism, such as a wireless Internet card or Bluetooth® technology, enables Consumers to check account balances, display and/or print E-Coupon Account contents, and to electronically reload their accounts 50 with additional E-Coupons 45 at any time. The device 158 may also be a personal digital assistant or personal computer that has access to a global communications network 20, e.g., the World Wide Web. Alternatively, a plastic card 110 having readable information 113 such as an associated account identifier or unique alphanumeric digits, may serve as the account access device 80 at a POS terminal 112. At the point of sale, the account access device 158 provides open-loop 194 access to the electronic coupon system 5. Open-loop access means that each E-Coupon 45 stored in the E-Coupon Account 50 can be redeemed or used at a variety of different Merchants or for a variety of different products. For example, when a Consumer 10 selects a product and presents the card 110 at one Merchant's POS terminal 112A, e.g., General Cinema Theatres, the card 110 is read by any of the Merchant's existing POS or credit/debit card readers 114A. In an open-loop system, the Consumer 10 may also present the card 110 at a POS terminal 112B of a second Merchant, e.g., Pick 'n Save®, using the second Merchant's existing readers 114B. The card 110 can be used at multiple Merchants, for example, at Wal-Mart®, ExxonMobil® gas stations, a dry cleaner, a restaurant, or the corner grocery store, as long as they have stored-value card acceptance capabilities at their POS terminals.

Figure 6:
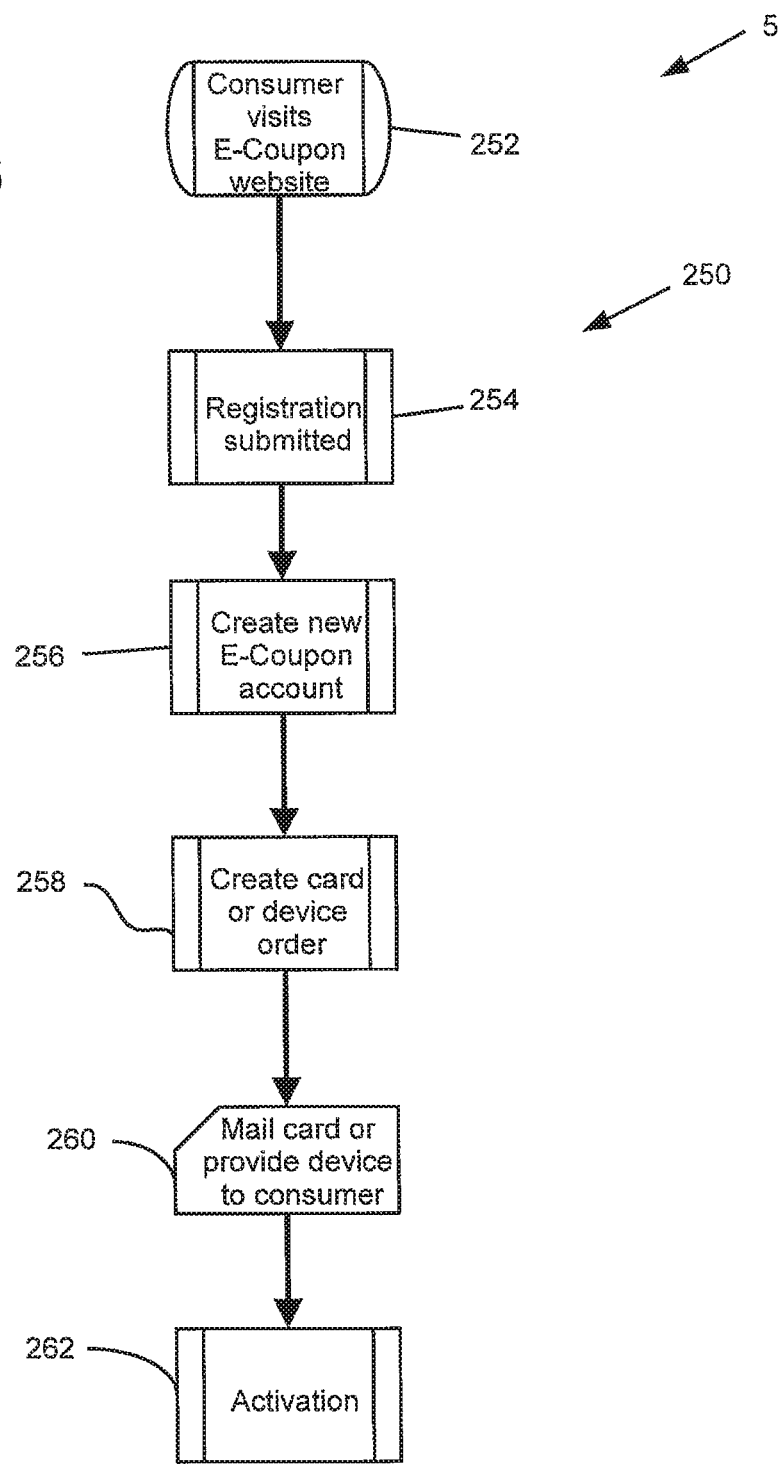
FIG. 6 illustrates a process flow diagram according to one aspect of the present invention.

FIG. 6 shows a flow diagram of another aspect of the electronic coupon system 5. In this FIG., the Consumer registration module 250 is shown. In the first step 252, the Consumer visits the E-Coupon website. In the next step 254, the Consumer has completed a registration process to establish an individualized account. The coupon system Program Administrator may create the E-Coupon Accounts and related Consumer access systems 256.

In step 258, an order is created for the Consumer, so that the Consumer may receive his or her E-Coupon card or download a program to enable account access via wireless device (not depicted). In one embodiment, the card may be sent to the Consumer pre-funded with introductory offers and coupons like a gift card. Alternatively, if the coupon system Program Administrator permits the user to select E-Coupons 45 before the card is activated, the card may come with an account loaded with E-Coupons 45 selected by the Consumer similar to a debit card account. In step 260, the E-Coupon card or account access device is provided to the Consumer. If deemed a requirement, the card is then activated by the Consumer in step 262 via the website prior to use or at a Merchant's POS terminal when used for the first time. The point of purchase or coupon redemption may alternatively be at an online grocery store website such as www.peapod.com.

Figure 7:
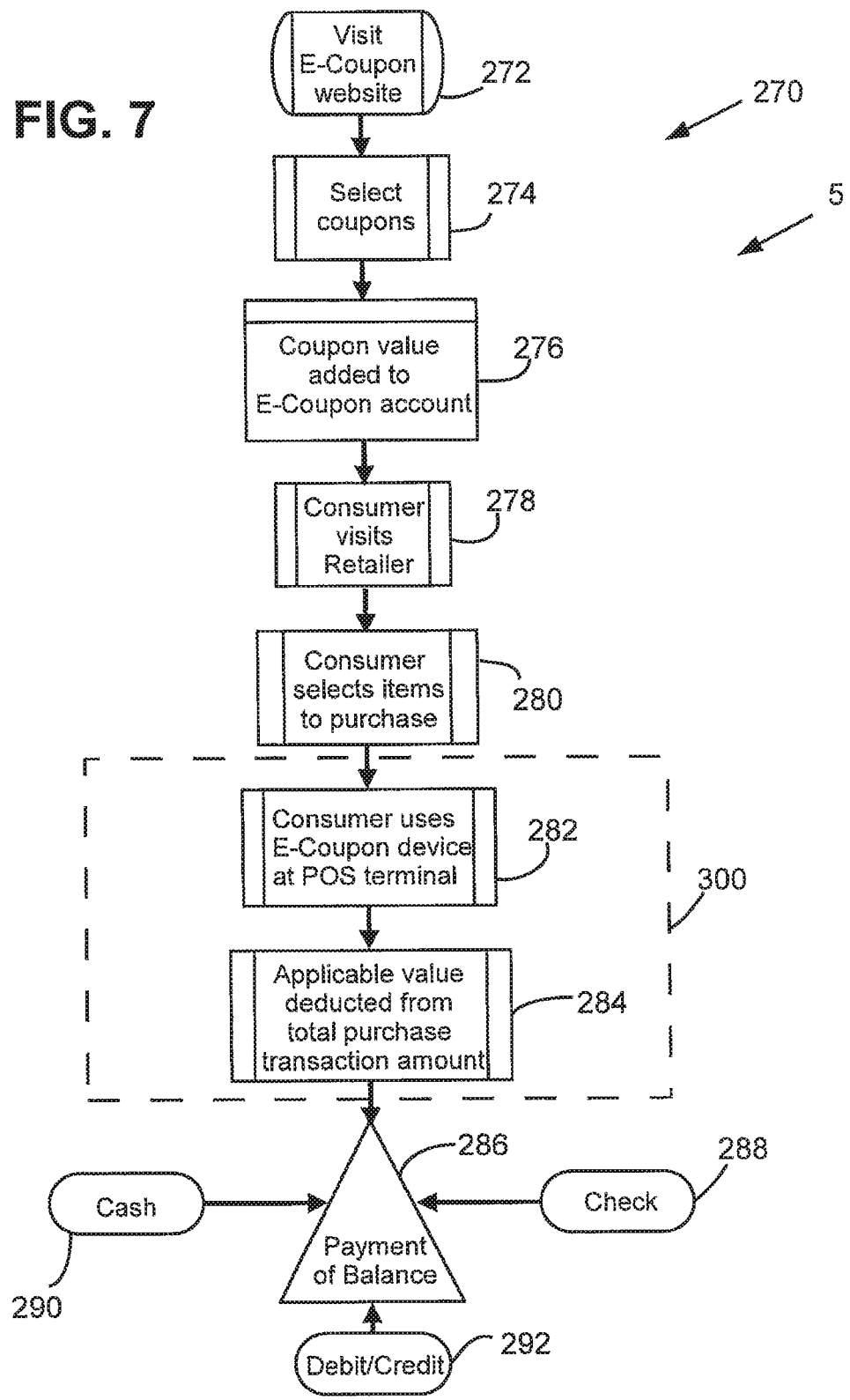
FIG. 7 illustrates a process flow diagram according to another aspect of the present invention.

FIG. 7 shows another aspect 270 of the electronic coupon system 5. After establishing an E-Coupon Account 50 via Consumer registration module 250 (FIG. 6), the Consumer visits the E-Coupon website in step 272 and, in step 274, selects from a multitude of Coupon Sponsor coupons to add to his E-Coupon Account 50. The E-Coupons and associated coupon information are then added to the Consumer's account in step 276. Additional E-Coupons can be added to the account at any time. In step 278, the Consumer visits a retail establishment such as a bricks and mortar store or a website retailer. The Consumer selects items to purchase as shown in step 280. As part of the checkout process in step 282, the Consumer presents an E-Coupon Account access device at the terminal to access the E-Coupons 45 stored in his or her E-Coupon Account 50 by, for example, swiping a magnetic strip on the back of an E-Coupon card (i.e., the account access device in this example).

In step 284, the applicable coupon values are electronically deducted from the Consumer's total purchase amount. The coupon value is essentially treated as one form of electronic tender type, in the same way that debit, credit or gift cards are also treated as electronic tender types. Steps 282 and 284 are part of the coupon authorization process 300 that processes the applicable E-Coupons 45 and is shown in greater detail in FIG. 8. After the coupon value is applied, a remaining balance, if any, is transmitted back to the POS terminal and presented to the Consumer in step 286. This balance represents the total retail price of the selected product or products after the coupon values have been subtracted from the total. The payment of the remaining balance can be accomplished by check 288, cash 290, debit or credit card 292, gift card, or any other accepted tender types.

Figure 8:
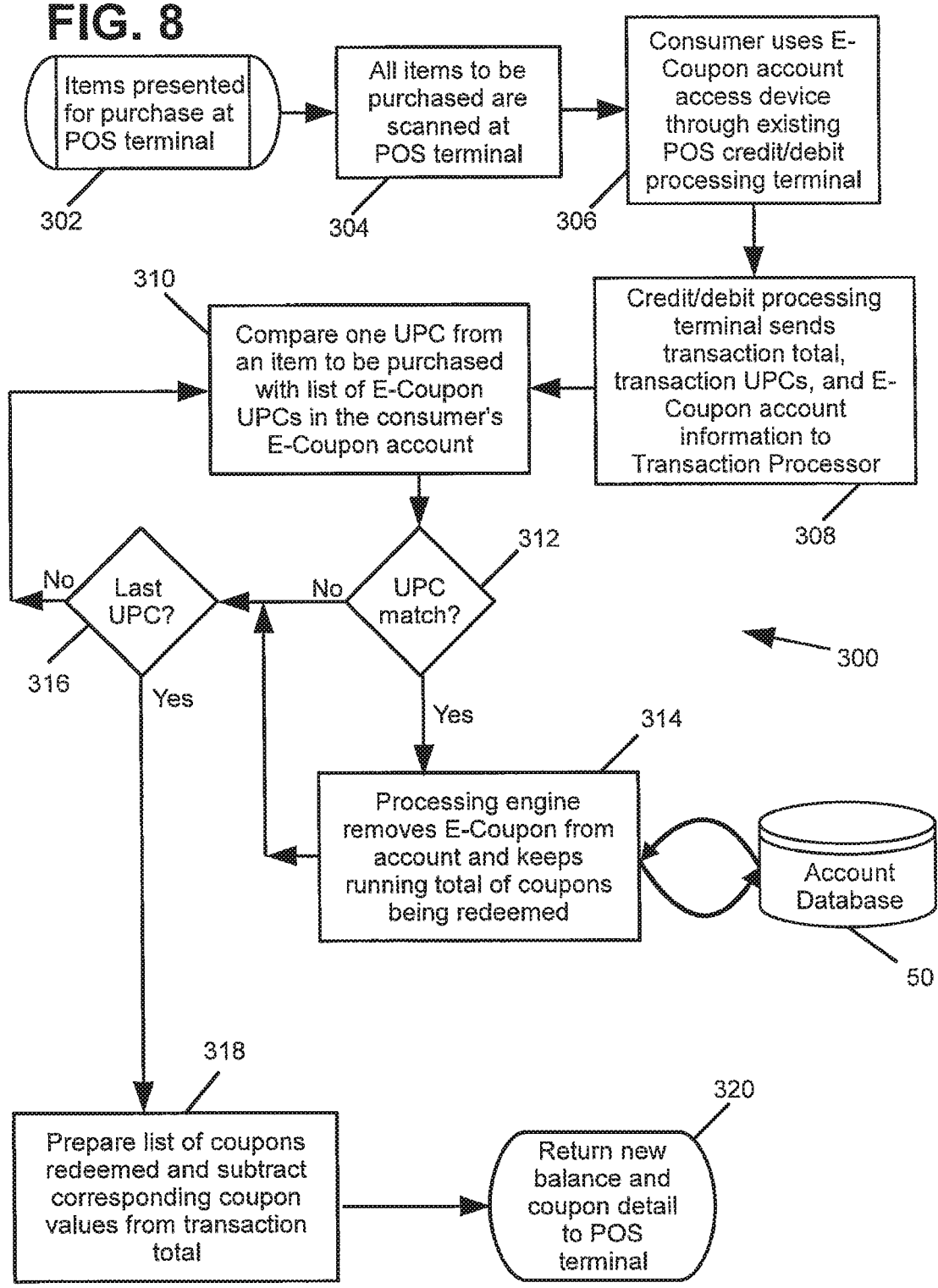
FIG. 8 illustrates a process flow diagram according to another aspect of the present invention.

As mentioned, FIG. 8 shows the basic flow of the electronic coupon authorization/substantiation process, or financial system, 300 for the E-Coupon system 5. The process starts after the items are presented for purchase in step 302 and then scanned at a checkout or POS terminal in step 304. In step 306, the Consumer presents the E-Coupon Account access device, e.g. E-Coupon card, to be scanned or swiped by a standard credit/debit reader connected to the POS terminal. Alternatively, the Consumer could use a personal information number (PIN) to access the E-Coupon Account 50 by entering it into the system through a portal at the POS terminal.

In the preferred embodiment shown, at step 308 the POS terminal and processing system sends the entire list of UPC data from the pending transaction to the Transaction Processor 56. Thereafter, in step 310, a processing engine at the Transaction Processor 56 separates and examines each UPC individually. In an alternative embodiment, not shown, the POS terminal 112 could determine the "eligible products" and send only the UPCs for the eligible products to the Transaction Processor 56. In this context, eligible products are products associated with Coupon Sponsors 92 who have contracted with a Program Administrator 55 to create and distribute E-Coupons 45 for at least some of their products. In this alternative embodiment, each UPC may be compared to a first data structure, containing eligible item identifiers, by the POS terminal 112, by the Transaction Processor 56, or by both to determine if the UPC represents an eligible product.

In step 312 of the preferred embodiment, the processing engine determines whether a UPC represents an item for which a coupon exists in the Consumer's E-Coupon Account 50, e.g., a second data structure. If it does not, the process then moves to step 316 to determine whether there are more UPCs from the pending transaction to be examined, and if so, the process moves back to step 310 and a new UPC is selected and examined. If, in step 312, the processing engine determines that the E-Coupon 45 is in the Consumer's account, i.e., the UPC is for a product with an associated coupon in the Consumer's E-Coupon Account 50, it then, in step 314, tallies the coupon values (which are applied in a later step after all the UPCs have been examined and accounted for) and removes the E-Coupon 45 from the Consumer's account 50. The process then moves to step 316 to determine whether there are more UPCs from the pending transaction to be examined. If so, the process moves back to step 310 and another UPC is selected and examined.

In the preferred embodiment, after all of the UPCs from the pending transaction have been examined, the process moves to step 318. In this step, a list of redeemed E-Coupons 45 is generated and the total redeemed coupon amount is subtracted from the total cost. Also, at some point of this process 300, expired E-Coupons 45 may be automatically removed from the Consumer's account with the unused coupon amounts released back to the Coupon Sponsor from the reserve account. Alternatively, expired E-Coupons 45 can be automatically eliminated from the Consumer's account as they expire. In step 320, the coupon detail and new transaction balance are returned to the POS terminal. In one embodiment, each transaction data detail could be stored in a third data structure by the Program Administrator 55.

In an alternate embodiment not shown, the POS terminal sends only the E-Coupon Account 50 number to the Program Administrator, which then sends back a list of items with corresponding E-Coupons 45, e.g., coupons that the Consumer has saved to his E-Coupon Account 50. The applicable coupon values are then applied by the POS terminal and processing system rather than at the E-Coupon Transaction Processor. The redeemed E-Coupon information is then sent back to the Program Administrator and the Consumer's E-Coupon Account 50 would be updated accordingly. In a still further embodiment (not shown), the UPC information could be combined with the payment information and sent to the Transaction Processor all at the same time. After the UPCs are examined and coupon values totaled, the payment is processed as a split tender between the redeemed coupon value and Consumer's funds.

Figure 9:
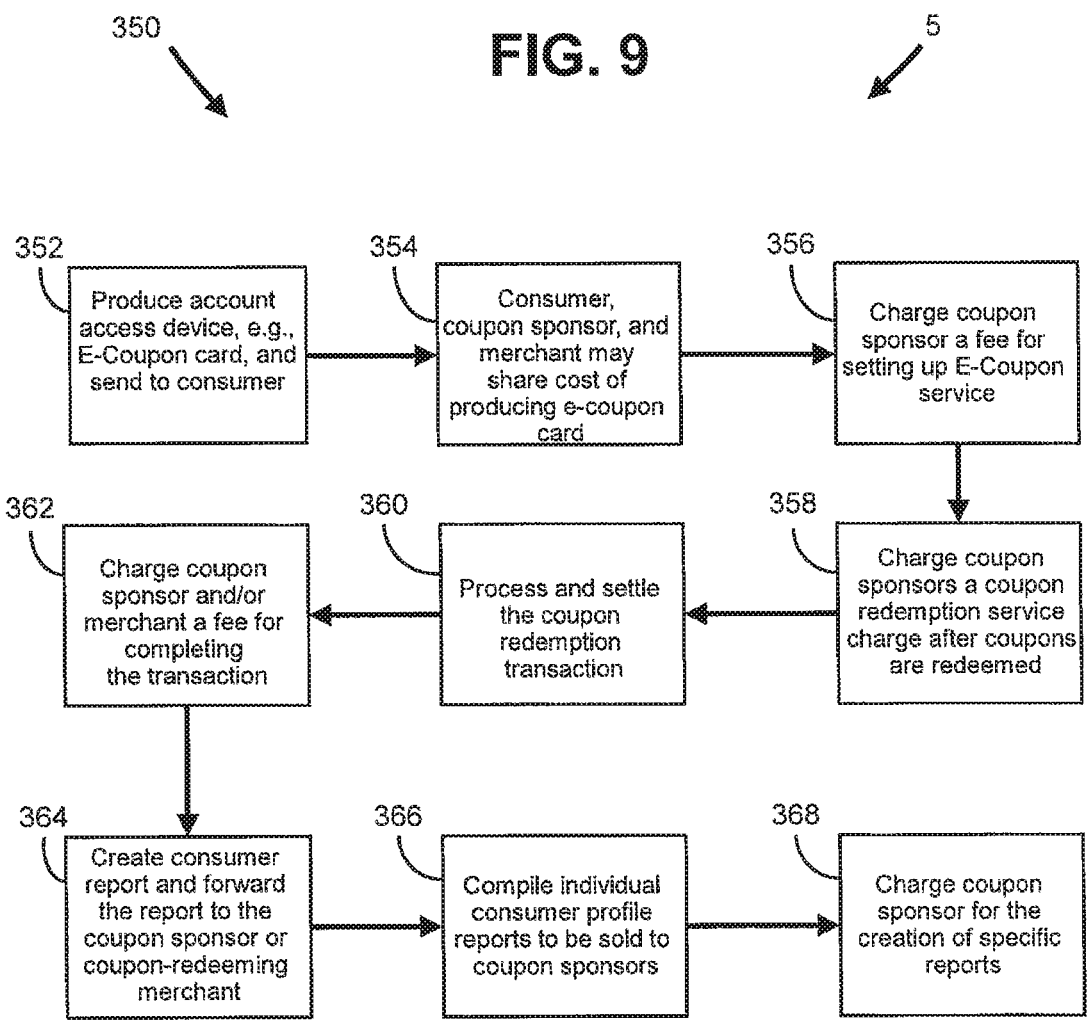
FIG. 9 illustrates a business process flow diagram according to another aspect of the present invention.

FIG. 9 shows one embodiment of a business process 350 associated with the electronic coupon system 5. In this embodiment the method of producing an electronic discount system begins with step 352, producing an account access device, e.g., an E-Coupon card or some other means to access an electronic coupon account that is then sent or transmitted to a registered redeemer, e.g., a Consumer. In the next step 354, the Consumer, i.e., the coupon redeemer, and the Coupon Sponsor or manufacturer may share the cost of producing the account access device. In the next step 356, the Program Administrator charges the Coupon Sponsor or manufacturer a fee for setting up the E-Coupon service. This may include configuring the Coupon Sponsor's systems to send coupon information to the Program Administrator when E-Coupons 45 become available. The coupon information would include data such as product information (either SKU or UPC numbers), amount, expiration date, and so on. In the next step 358, the Coupon Sponsor is charged a coupon redemption service charge after an E-Coupon 45 has been redeemed electronically at POS by a Consumer. This charge generally includes a step 360 of processing and settling the coupon redemption transaction. In one embodiment, a step 362 includes charging the retailer or Merchant a fee for completing the transaction. In a step 364, the Program Administrator creates a redeemer/consumer report and forwards the report to the Coupon Sponsor or manufacturer or coupon-redeeming Merchant. This report may be used to help the Coupon Sponsor better plan its discount methodology, direct marketing, production processes, and product inventory based on E-Coupons 45 selected by Consumers in its geographical area. In one embodiment, step 366 includes compiling individual consumer profile reports to be sold to the Coupon Sponsor to better help it tailor its direct marketing advertising efforts to specific Consumer profiles. In the final step 368 shown, the Program Administrator charges the Coupon Sponsor or manufacturer for the creation of the specific reports.

Figure 10:
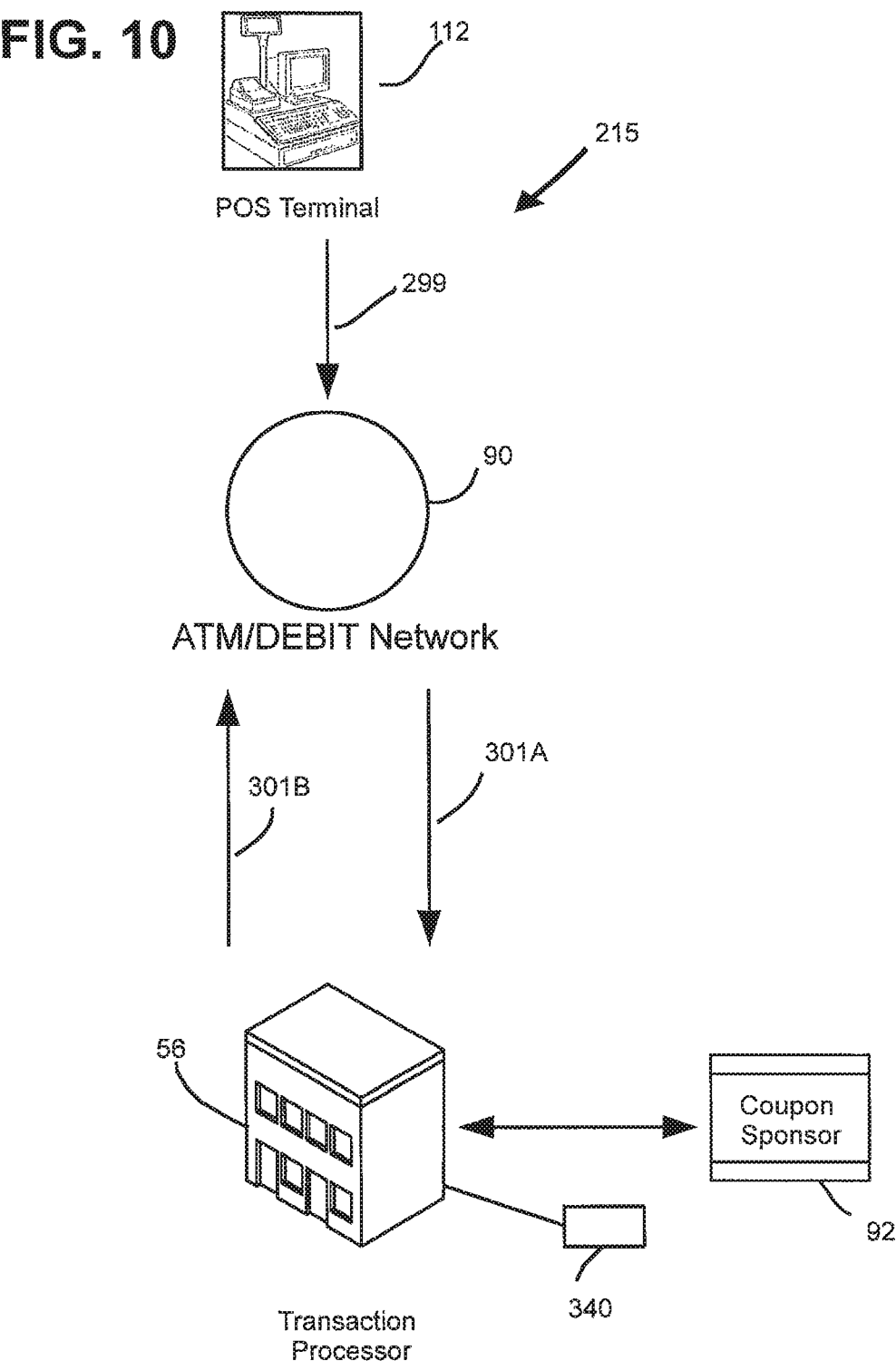
FIG. 10 shows one other alternative embodiment of the present invention.

While the above described flow illustrates several ways for the Program Administrator to generate revenues, there are additional ways available. For example, such an E-Coupon card process could generate revenue by:

Card production
Coupon download service charge
Coupon redemption service charge
Processing fee for the transaction
Report-creation
Compiling individualized consumer profile reports
Coupon redemption profiles An alternative embodiment of the electronic coupon system 215 is shown in FIG. 10. FIG. 10 illustrates one possible flow of transaction information between the Merchant's POS terminal 112, a financial communications Network 90 and a Transaction Processor 56. This is part of the so-called "back end" process. The connection, e.g., Network portal 299, between the POS terminal 112 and the Transaction Processor 56 via the Network 90 here may be directly through the E-Coupon Transaction Processor's electronic funds transfer (EFT) Network utilizing, e.g., the ISO 8583 standard, through another financial institution's EFT Network, through a virtual private network (VPN) via the Internet, or some other similar communication means. Such methods are described in detail in U.S. application Ser. No. 11/285,053. In the embodiment shown in FIG. 10, the information exchange between the Network portal and the Transaction Processor includes the Consumer's E-Coupon Account information and the UPCs from the pending transaction 301A. The exchange also includes an authorization amount response 301B corresponding to the total coupon discount.

Figure 11:
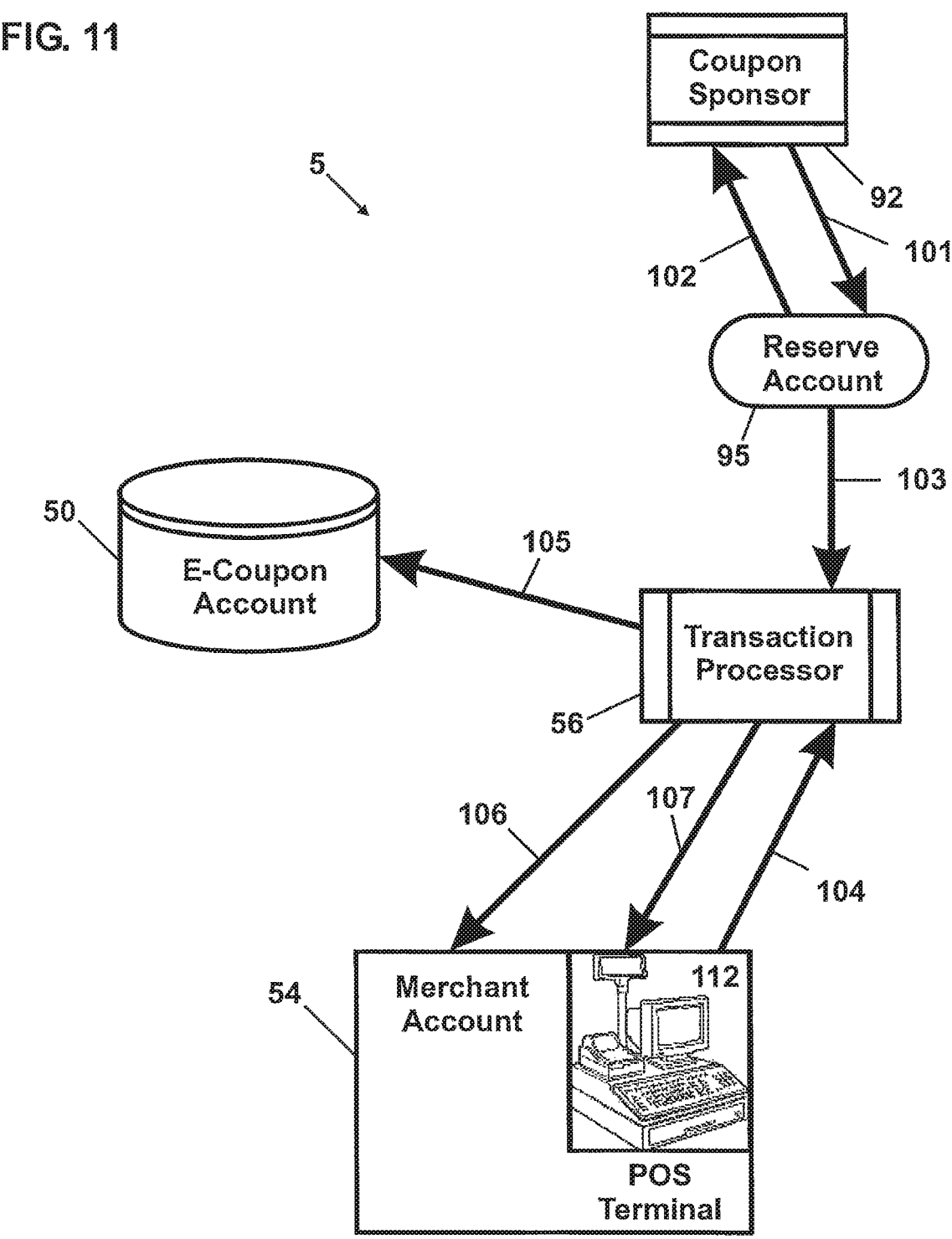
FIG. 11 illustrates a process flow diagram according to another aspect of the present invention.

FIG. 11 illustrates in further detail the coupon redemption and settlement process shown as step 360 in FIG. 9. As shown, Coupon Sponsor 92 preferably first transfers funds via line 101 to a cash reserve account 95 to cover the redemption of specific E-Coupons 45 being offered by that Coupon Sponsor for its products or services. However, if the E-coupons 45 expire or remain otherwise unredeemed, e.g., because of a product cancellation or recall, funds may be released back via line 102 to the Coupon Sponsor from the reserve account 95.

Once funds are made available to the reserve account 95, the cash reserve account 95 may be accessed via line 103 by the Transaction Processor 56 to reimburse Merchants, such as retailers, via electronic funds transfer ("EFT") who have redeemed E-Coupons 45. As shown, the Merchant's POS terminal 112 transmits a consumer's E-Coupon Account 50 access information and the UPCs of items being purchased by the consumer via line 104 and as further shown in FIG. 8. The Transaction Processor 56 preferably next determines which UPCs have a corresponding E-Coupon 45 in the E-Coupon Account 50 via line 105. Preferably, the value of E-Coupons 45 that are being redeemed plus a redemption fee are extracted from each reserve account 95 of corresponding Coupon Sponsors utilizing the EFT technology (103) by the Transaction Processor, e.g., a redemption fee of 8 cents. The total value of the E-Coupons 45 being redeemed in that transaction is then transferred from the Transaction Processor 56 to the Merchant Account 54 utilizing EFT technology via line 106. This process may occur in real-time or batch mode. The Transaction Processor 56 also sends transaction data back via line 107 to the POS 112 to indicate the E-Coupons 45 that have been redeemed, the corresponding value for each redeemed E-Coupon 45, and the remaining amount owed by the consumer. Further, once the transfer of funds from the reserve account to the merchant account occurs, the Transaction Processor 56 preferably then prepares coupon redemption transactional reports to the Coupon Sponsor 92 for its records.

In terms of alternative embodiments for the current invention, it should be apparent that there are several possible options for back end processing. Of course, one goal is to ensure real-time or near real-time substantiation, i.e., processing, settling, and clearing applicable E-Coupons, while the customer is purchasing products or services at the POS. This is sometimes referred to as auto-substantiation.

A. Real-time Auto-Substantiation Record Match

This alternative method is dependent upon a record to be sent to the Transaction Processor from the Program Administrator. As mentioned above, for example, a single provider, Metavante, may serve as both the Transaction Processor and the Program Administrator. When an E-Coupon selection record is received from the front-end of the system, Metavante will store the record in a database. Upon receipt of a real-time E-Coupon redemption authorization request, a validation check is performed to determine if the dollar amount of the authorization will match against one or more E-Coupon records in the database. When a match is determined, and all other authorization checks are valid, the transaction is approved and a hold record 340 is created for the authorization. The hold record 340 is marked as substantiated and a response is sent back to the Merchant for approval. When the settlement record is received in a batch file from the Network and posted to the system later, it is matched against the hold record 340 and marked as substantiated.

B. Selected Merchant Transactions

In this alternative method, when an E-Coupon card is presented for payment at a selected Merchant, e.g., Walgreens®, a real-time transaction is sent directly to Metavante® from Walgreens with the dollar amount and product data, e.g. an SKU. Only discount eligible items as determined internally by Walgreens are sent, e.g., special in-store discounts offered only by that Merchant. The Metavante system performs validity checks. Metavante posts the requested amount to a database and sends a response to Walgreens. Upon receipt of the response, Walgreens formats an authorization transaction that is sent to Metavante. The system will perform authorization validation along with validation against the database holding the transaction. When a database match is determined, and all other authorization checks are valid, the transaction is approved and a hold record 340 is created for the authorization. The hold record 340 is marked as substantiated and a response is sent back to Walgreens®. When the settlement record is received in the batch file from the Network and posted to the system, it is matched against the hold record 340 and marked as substantiated. Walgreens has described a related processing method in US Pat. Pub. No. 2005/0178828, which is herein incorporated by reference.

A variation on the above described Merchant system is one implemented by another retailer, e.g., Wal-mart. Wal-mart has its own Inventory Information Approval System. When a E-Coupon card is presented for payment at Wal-mart, its system determines which items are discount eligible and then sends a real-time authorization transaction to Metavante with the dollar amount of the eligible items. The Metavante system will perform authorization validity checks and, when applicable, approve the transaction. A hold record 340 is created for the authorization and marked as substantiated and a response is sent back to Wal-mart. When the settlement record is received in the batch file from the Network and posted to the system, it is matched against the hold record and marked as substantiated.

Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A server comprising:
   at least one storage device comprising instructions; and
   a processor configured to execute the instructions to perform operations comprising:
     receiving, from a user device via a communication network, information indicating an electronic coupon selected by a user;
     loading, in a first data structure associated with the user device, a coupon identifier, a dollar amount, and an expiration date associated with the selected electronic coupon;
     in response to receiving the information indicating the selected electronic coupon, transmitting, via the communication network, identification information of the first data structure to the user device;
     receiving, from a terminal device via the communication network, a coupon redemption authorization request, the request comprising the identification information of the first data structure, transaction data regarding a purchase, and an item identifier representing a purchased item;
     comparing the item identifier and a dollar amount of the purchased item to coupon information stored in the first data structure; and
     in response to comparing the item identifier and the dollar amount of the purchased item to the coupon information stored in the first data structure, sending in real-time, via the communication network, an approval signal to the terminal device.

2. The server of claim 1, wherein the user device comprises at least one of a mobile phone, a wireless device, a personal digital assistant device, or a computer.

3. The server of claim 1, wherein the first data structure is associated with an electronic coupon account.

4. The server of claim 1, wherein the terminal device is a point-of-sale terminal associated with a merchant.

5. The server of claim 1, wherein the operations further comprise:
   displaying, via an access portal, a plurality of electronic coupons.

6. The server of claim 5, wherein the access portal is a website.

7. The server of claim 5, wherein the operations further comprise:
   displaying the plurality of electronic coupons in response to a search query sent by the user device.

8. The server of claim 5, further wherein the operations further comprise:
   sorting the displayed electronic coupons according to at least one of coupon sponsor, product type, service type, product size, brand name, or expiration date.

9. The server of claim 5, further wherein the operations further comprise:
   displaying, via the access portal, a clickable icon or a selectable check box for each of the plurality of electronic coupons.

10. The server of claim 1, wherein the operations further comprise:
    in response to comparing the item identifier and the dollar amount of the purchased item to the coupon information stored in the first data structure, automatically initiating a funds transfer, via the communication network, to a merchant account associated with the terminal device.

11. The server of claim 1, wherein the operations further comprise:
    determining, based on the expiration date, whether the selected electronic coupon has expired; and
    in response to determining that the selected electronic coupon has expired, automatically removing the coupon identifier of the selected electronic coupon from the first data structure and automatically releasing unused funds associated with the selected electronic coupon to a coupon sponsor of the selected electronic coupon.

12. The server of claim 1, wherein the item identifier comprises at least one of a Universal Product Code (UPC) or a Stock Keeping Unit (SKU) number.

13. The server of claim 1, wherein the communication network comprises at least one of an Electronic Funds Transfer (EFT) network and a Virtual Private Network (VPN).

14. The server of claim 1, wherein the transaction data comprises a total transaction balance, and the operations further comprise:
    in response to comparing the item identifier and the dollar amount of the purchased item to the coupon information stored in the first data structure,
      determining an updated transaction balance by subtracting the dollar amount of the purchased item from the total transaction balance, and
      sending in real-time, via the communication network, the updated transaction balance to the terminal device.

15. The server of claim 1, wherein the item identifier of the purchased item corresponds to the selected electronic coupon, and the operations further comprise:
    removing the coupon identifier of the selected electronic coupon from the first data structure.

16. A method implemented by a hardware processor of a server, the method comprising:
    receiving, from a user device via a communication network, information indicating an electronic coupon selected by a user;
    loading, in a first data structure associated with the user device, a coupon identifier, a dollar amount, and an expiration date associated with the selected electronic coupon;
    in response to receiving the information indicating the selected electronic coupon, transmitting, via the communication network, identification information of the first data structure to the user device;
    receiving, from a terminal device via the communication network, a coupon redemption authorization request, the request comprising the identification information of the first data structure, and an item identifier representing a purchased item;
    comparing the item identifier and a dollar amount of the purchased item to coupon information stored in the first data structure; and
    in response to comparing the item identifier and the dollar amount of the purchased item to the coupon information stored in the first data structure, sending in real-time, via the communication network, an approval signal to the terminal device.

17. The method of claim 16, further comprising:
displaying, via an access portal, a plurality of electronic coupons in response to a search query sent by the user device.

18. The method of claim 17, further comprising:
sorting the displayed electronic coupons according to at least one of coupon sponsor, product type, service type, product size, brand name, or expiration date.

19. The method of claim 17, further comprising:
displaying, via the access portal, a clickable icon or a selectable check box for each of the plurality of electronic coupons.

20. A non-transient computer-readable medium comprising a computer program that, when executed by a processor, causes the processor to perform operations comprising:
receiving, from a user device via a communication network, information indicating an electronic coupon selected by a user;
loading, in a first data structure associated with the user device, a coupon identifier, a dollar amount, and an expiration date associated with the selected electronic coupon;
in response to receiving the information indicating the selected electronic coupon, transmitting, via the communication network, identification information of the first data structure to the user device;
receiving, from a terminal device via the communication network, a coupon redemption authorization request, the request comprising the identification information of the first data structure, transaction data regarding a purchase, and an item identifier representing a purchased item;
comparing the item identifier and a dollar amount of the purchased item to coupon information stored in the first data structure; and
in response to comparing the item identifier and the dollar amount of the purchased item to the coupon information stored in the first data structure, sending in real-time, via the communication network, an approval signal to the terminal device.

* * * * *